3,328,096
BEARING RETENTION MEANS
Philip Lees, Wapping, and Alfonso M. Pavese, Bolton, Conn., assignors to United Aircraft Corporation, East Hartford, Conn., a corporation of Delaware
Filed Apr. 21, 1965, Ser. No. 449,733
6 Claims. (Cl. 308—207)

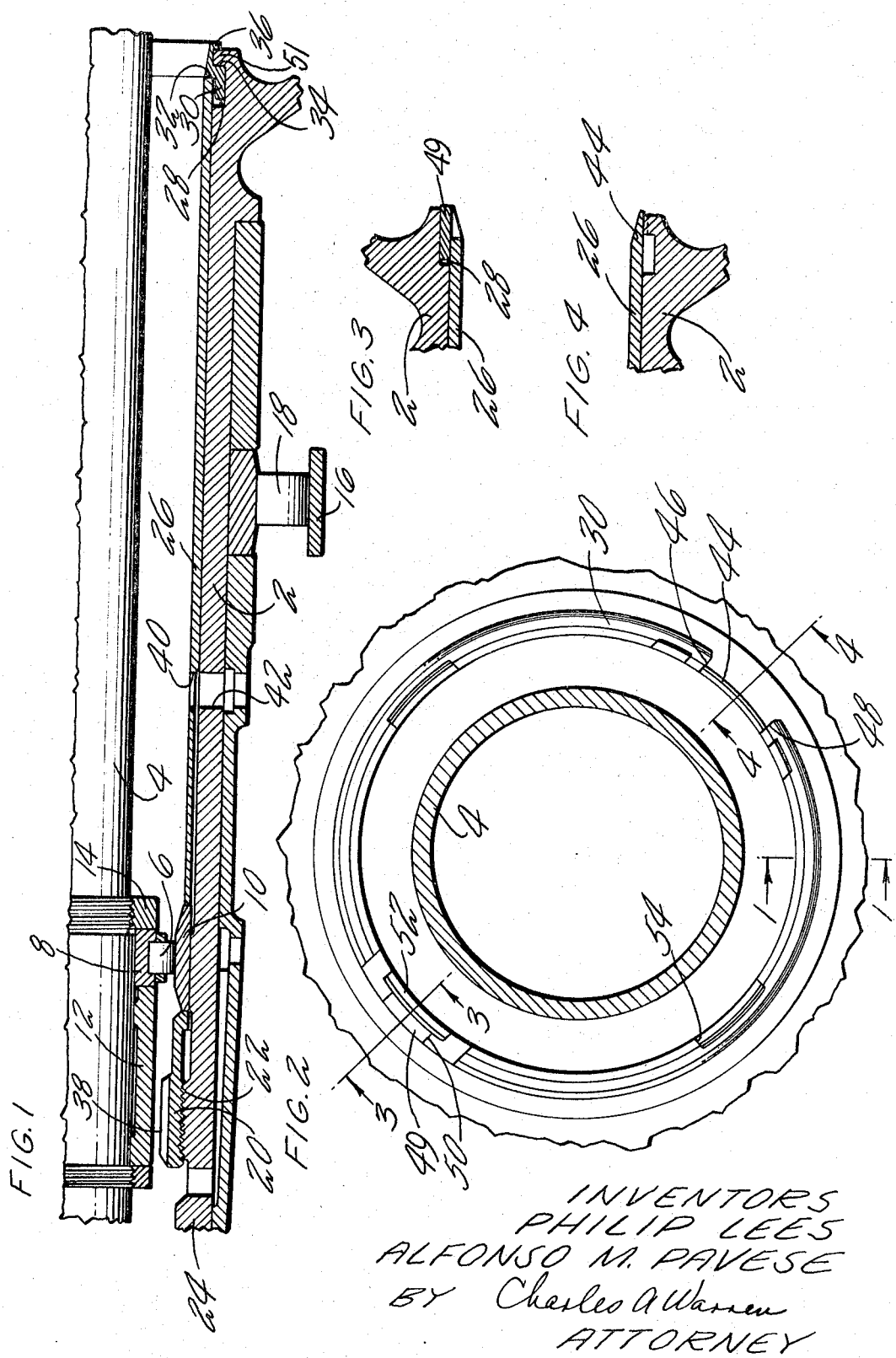

ABSTRACT OF THE DISCLOSURE

A bearing retention device wherein an outer race is positioned and locked within a shaft while the inner race and bearing elements may be assembled and disassembled without removing the outer race. Also, the locking ring and members it cooperates with are indexed so that passage in the members becomes radially aligned after assembly.

---

This invention relates to retention means particularly for locating a bearing race within a shaft at a point spaced from the end of the shaft.

One feature of the invention is the location of the race by a sleeve between the race and a locking means at the end of the shaft and with a threaded ring at the inner end of the race by which to lock the assemblage of race, sleeve and locking ring axially in position.

Another feature is the location of the locking ring and sleeve angularly within the shaft to prevent rotation and if desired to align radial passages in the sleeve and shaft. Another feature is a retention device which will be thin enough in a radial dimension that an inner shaft, carrying the bearing elements and inner race, will not be in contact with the retention structure.

Other features and advantages will be apparent from the specification and claims, and from the accompanying drawing which illustrates an embodiment of the invention.

FIG. 1 is a longitudinal sectional view through a shaft with the invention therein, the sectional view being taken substantially along the line 1—1 of FIG. 2.

FIG. 2 is an end elevation of the shaft.

FIG. 3 is a fragmentary sectional view along the line 3—3 of FIG. 2.

FIG. 4 is a sectional view substantially along the line 4—4 of FIG. 2.

The invention is shown as applied to a bearing retention device for use on the outer shaft 2 for a gas turbine engine of the type shown generally in the Savin Patent No. 2,747,367. The arrangement for holding the bearing race in position is necessitated by the presence of an inner shaft 4 on the same axis as the shaft 2 and closely spaced from the outer shaft. These two shafts are held in spaced relation and supported one with respect to the other by a roller bearing including the rollers 6, the inner race 8 mounted on the inner shaft 4 and the outer race 10 supported within the outer shaft 2. The inner race is held in position axially on the shaft 4 by being clamped between a sleeve 12 and a clamping nut 14. The inner shaft 4 may, and in the arrangement shown, does extend beyond the end of the outer shaft 2. The outer shaft is supported within the supporting structure 16 by bearings 18.

In supporting the bearing race 10 in poistion, it is essential that it be securely locked axially within the shaft 2 so that it will be retained in engagement with the row of rollers 6. To accomplish this, a threaded ring 20 is placed within the outer shaft 2 in the threads thereon with engagement with the threads 22 on the inner surface of the shaft. The bearing race 10 is then placed within the outer shaft. At this point it will be understood that the ring 20 has been threaded into the shaft until the end of the ring engages a stop 24 formed on the shaft. A locating elongated sleeve 26 is then positioned within the outer shaft 2 with the inner end thereof in engagement with the bearing race 10. At this time the outer end of the sleeve 26, as shown, will be to the left of an internal groove 28 formed within and adjacent to the end of the shaft 2. A locking ring 30 is positioned at the end of the shaft with a portion of the ring fitting within the groove 28. The ring normally has the cross section shown in FIG. 1 in which the locking ring has a shoulder 32 for engagement with the end of the sleeve 26 and an opposed shoulder 34 engageable with the right-hand end of the groove 28. The ring 30 overlies the end of the shaft and has an outwardly projecting small rib 36 which prevents the locking ring from moving axially inward within the shaft. When the locking ring 30 is in position, the ring 20 is turned to cause its movement toward the right into the position shown thereby moving the sleeve 26 and bearing race 10 also into the position shown and clamping the elements securely against one another. The ring 20 may be turned as by splines 38 on the inner surface thereof.

The inner surface of the locating sleeve 26 has a radial passage 40 therein which is intended to line up with a cooperating radial passage 42 in the shaft 2. To accomplish this, the sleeve 26 has an axially projecting tab 44 at the right-hand end in a position to extend between the spaced ends 46 and 48 of the locking ring 30 thereby locating the sleeve 26 angularly with respect to the locking ring. The latter, in turn, is located angularly with respect to the shaft 2 since at one point in the locking ring the latter has a projecting tab 49 forming an extension of the portion of the ring normally fitting within the groove 28, this projecting tab being shown more clearly in FIG. 3. At the proper location on the shaft 2 the inwardly extending rib 51, defined by the groove 28, is cut away to leave a gap 50 to accommodate the tab 49. By locating the gap 50 angularly with respect to the passage 42, it will be apparent that the locking ring when inserted will be properly indexed so that when the projecting tab 44 fits between the ends of the locking ring the passages 40 and 42 will be in alignment.

The sleeve 26 also serves as a ramp in the assembly of the inner shaft 4 with the bearings thereon within the outer shaft. Suitable seals may be positioned between the sleeve 26 and the inner shaft 4 to localize the lubricant to the bearing, and in this event it may be desirable to make the sleeve of a material different from the adjacent material to eliminate possibility of sparking in the event of a bearing or seal failure.

Removal of the device for inspection or replacement of the bearing race 10 is accomplished by turning the clamping ring 20 to cause movement to the left against the stop 24, the inner shaft having been removed at this time for access to the parts. When this is accomplished the bearing ring 10 and sleeve 26 may be moved to the left. The right-hand end of the sleeve 26 is at this time exposed through the locking ring to the point 52 where the tab 46 is located and diametrically opposite to the point where the ends of the locking ring are spaced apart. Other notches 54 diametrically opposed to each other may also be provided in the locking ring so that a suitable tool may be applied at these points for forcing the sleeve 26 to the left.

It is to be understood that the invention is not limited to the specific embodiment herein illustrated and described, but may be used in other ways without departure from its spirit as defined by the following claims.

We claim:

1. A bearing retention device including a shaft, a bearing race within the shaft, a threaded ring at one end of the race having threaded engagement with the shaft, a sleeve within the shaft, the inner diameter of said sleeve being greater than the inner diameter of the bearing race, said sleeve engaging the outer end of the race, a locking ring within the end of the shaft for retaining the sleeve in position, said locking ring being located at the end of the shaft remote from said threaded ring and having an inner diameter substantially the same as the inner diameter of the sleeve, said locking ring and shaft having cooperating means to position the locking ring angularly within the shaft, said sleeve and locking ring having cooperating means for locating the sleeve angularly with respect to the locking ring and said shaft and said sleeve having cooperating passages which are radially aligned by said cooperating means on the sleeve and locking ring.

2. A bearing retention device as in claim 1 in which the shaft has an annular groove adjacent the end to receive at least a part of the locking ring, and the sleeve overlies at least a part of the locking ring.

3. A bearing retention device as in claim 1 in which the threaded ring has splines thereon for turning the ring within the shaft.

4. A retention and locating device including cooperating rotary inner and outer coaxial shafts, the inner shaft spaced radially from the outer shaft, including a bearing between said shafts and remote from said adjacent end, said bearing having an outer race, an inner race and bearing elements carried by the inner shaft, a threaded ring having threaded engagement with and located within the outer shaft and in endwise engagement with one end of said outer race, said threaded ring being remote from said adjacent end of the outer shaft, a sleeve within the outer shaft and in engagement endwise with the other end of said race and extending from said race substantially to the end of the outer shaft and having an inner diameter greater than the inner diameter of the bearing race, and a locking ring within and engaging said outer shaft to retain said sleeve in position within the shaft, the inner diameter of said locking ring being substantially the same as the inner diameter of said sleeve, said threaded ring providing for tightening the race against the sleeve and the sleeve against the locking ring.

5. A retention and locating device as in claim 4 in which the locking ring has a tab for engagement with a cooperating slot in the shaft to locate the locking ring angularly, and the locking ring and the sleeve have cooperating means to locate the sleeve angularly with respect to the locking ring.

6. A retention and locating device as in claim 5 in which the locking ring is split and the sleeve has a projecting tab extending between the spaced ends of the split locking ring.

References Cited

UNITED STATES PATENTS 1,909,230  5/1933  Smith.

FOREIGN PATENTS 695,275  8/1953  Great Britain.

MARTIN P. SCHWADRON, *Primary Examiner.*

F. SUSKO, *Assistant Examiner.*